March 28, 1961 G. P. CARMOSINO 2,976,641
FISH HOOK ASSEMBLY
Filed July 2, 1959
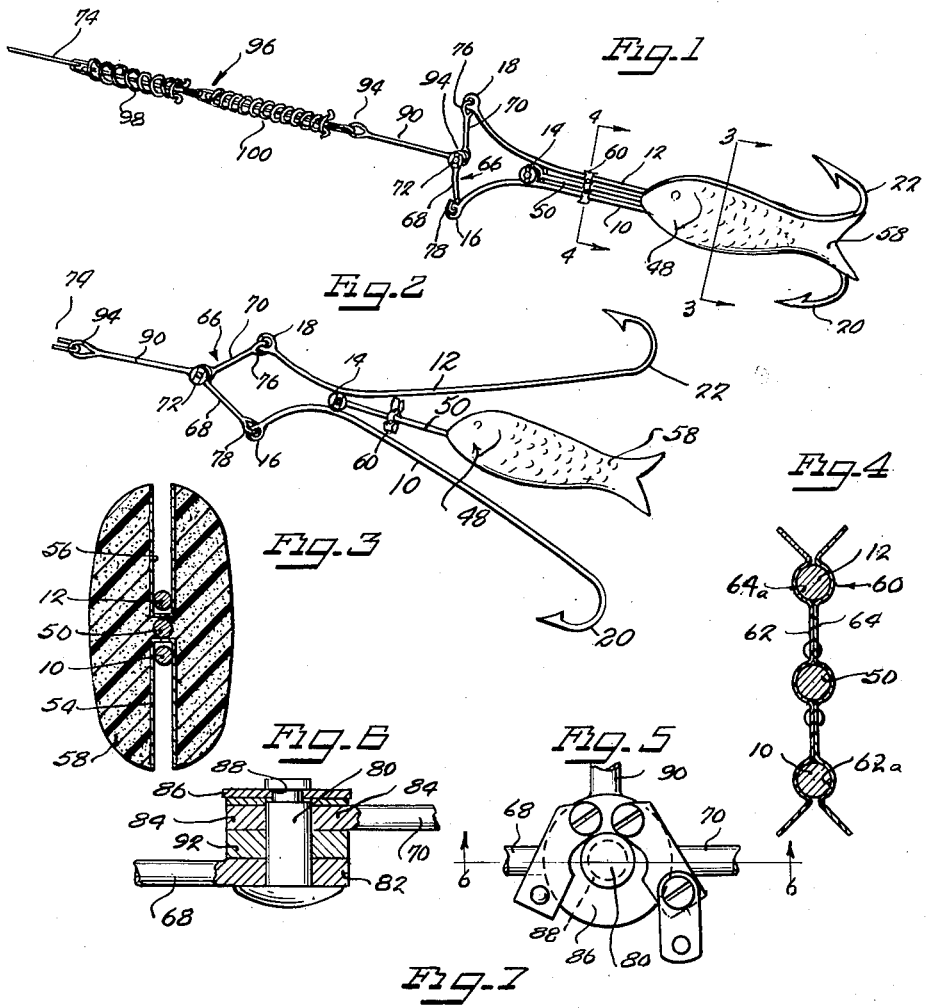
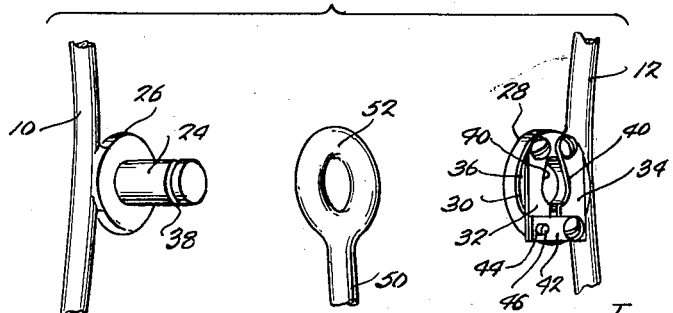
Inventor
GIUSEPPE P. CARMOSINO
By Soans, Anderson, Luedeka & Fitch
Attys 2,976,641

FISH HOOK ASSEMBLY

Giuseppe P. Carmosino, 5934 W. Addison St., Chicago, Ill.

Filed July 2, 1959, Ser. No. 824,703

4 Claims. (Cl. 43—35)

The present invention relates to fish hook assemblies and more particularly to an improved fish hook assembly of the type which is expanded when the fish strikes the bait and exerts a pull thereon.

Previously available fish hook assemblies of the expandable type have been very effective in firmly hooking fish. However, because of the construction of such expandable hook assemblies, it has been very difficult to remove the hooks from the fish's mouth once they are set therein. Moreover, the prior devices have been so constructed that, when used in connection iwth fresh bait, there has generally resulted a loss of bait as well as considerable loss of fishing time in extricating the hooks from the fish.

It is an object of the present invention to provide an improved fish hook assembly of the expanable type. Another object of the invention is the provision of an expandable fish hook assembly which may be disassembled to extricate the hooks from the fish's mouth. A further object is the provision of an expandable fish hook assembly which is relatively inexpensible to construct and is durable in use.

Other objects and advantages of the present invention will become apparent by reference to the following description and accompanying drawings.

In the drawings:

Figure 1 is a perspective view of a fish hook assembly showing various features of the present invention, the fish hook assembly being shown in its trolling or closed position;

Figure 2 is a perspective view of the fish hook assembly shown in Figure 1 in its expanded or open position;

Figure 3 is an enlarged transverse sectional view taken generally along line 3—3 of Figure 1;

Figure 4 is an enlarged transverse sectional view taken generally along line 4—4 of Figure 1;

Figure 5 is an enlarged fragmentary plan view of the forward pivot means of the fish hook assembly shown in Figure 1, the pivot means being shown in its unlocked position;

Figure 6 is a transverse sectional view taken along line 6—6 of Figure 5; and,

Figure 7 is an enlarged exploded perspective view of the rearward pivot means of the fish hook assembly shown in Figure 1.

The fish hook assembly in accordance with the present invention comprise a pair of shanks which are releasably interconnected intermediate their forward ends and rearward ends by a rearward pivot means. The shanks have diverging forward portions and outwardly directed hooks connected to the rearward ends thereof. Bait holding means is connected to the rearward pivot means. The forward forward ends of the shanks are pivotally interconnected to the outer ends of a pair of links, the inner ends of the links being releasably interconnected by a forward pivot means. Means are provided to connect the forward pivot means to a fish line.

More particularly, the fish hook assembly includes a pair of shanks 10 and 12 which are pivotally interconnected by a rearward pivot means 14 intermediate their ends. For purposes of explanation, the leading end of the fish hook assembly as it moves through the water during trolling is referred to as the forward end and the trailing end of the fish hook assembly is referred to as the rearward end.

In the illustrated embodiment, the rearward portions of the shanks 10 and 12 are made relatively straight and outwardly directed barbed fish hooks 20 and 22 are provided at the rearward ends of the shanks 10 and 12, respectively.

So that the shanks 10 and 12 may be quickly separated to remove the fish hooks from the mouth of the fish, the rearward pivot means 14 is constructed so that it may be easily disassembled. In the illustrated embodiment, the rearward pivot means 14 includes a headed shaft 24 which extends through and is connected to an inwardly extending eyelet 26 on one shank 10. The shaft 24 is journaled in an eyelet, or bearing 28 which extends inwardly from and is connected to the other shank 12.

The bearing 28 is prevented from moving axially along the shaft 24 by a releasable collar 30 which is fixedly connected to the bearing 28 so that it cannot be lost. The releasable collar 30 includes a pair of spaced apart locking arms 32 and 34 which are pivoted at one end to a washer 36, the washer 36, in turn, being suitably attached to the bearing 28. In their closed position, the locking arms 32 and 34 are adapted to engage a cooperating peripheral groove 38 in the shaft 24. To increase the area of engagement with the shaft 24, semicircular portions of the inner margins of the locking arms 32 and 34 are cut away as indicated by the reference numeral 40.

A pivoted catch 42 is provided to prevent the locking arms 32 and 34 from becoming accidentally disengaged from the shaft 24. As shown in Figure 7, the catch 42 is pivotally mounted by one end to the outer end of one locking arm 34. The other end of the catch 42 is provided with an aperture 44 which receives a pin or projection 46 on the outer end of the other locking arm 32.

Bait means 48 is swingably mounted on the shaft 24 between the bearing 28 and the eyelet 26. In the illustrated embodiment, the bait means 48 includes a rearwardly extending rod 50 disposed between the shanks 10 and 12, the rod being provided with an eyelet 52 on its forward end. The eyelet 52 is rotatably mounted to the shaft 24.

As shown in Figure 3, a pair of elongated U-shaped members 54 and 56 having their bases in opposed relationship are suitably connected to the rearward portion of the rod 50 so as to respectively receive the shanks 10 and 12 when the fish hook assembly is in its closed or trolling position. Bait may be suitably attached to sides of the members 54 and 56. The bait 58 may be fresh bait, such as a smaller fish, or may be a piece of plastic or similar material shaped to resemble a fresh bait, as shown in Figure 3, and may be suitably attached to the plates 54 and 56 by various adhesive means (not shown).

The fish hook assembly is maintained in its closed or trolling position, wherein the shanks 10 and 12 are in adjacent relationship to the rod 50, by a spring clamp 60 suitably attached to the rod. As shown in Figure 4, the spring clamp 60 includes two abutting strips 62 and 64 of spring metal suitably attached to, and extending transversely of the rod 50. The outer ends of the spring clamp 60 are provided with pockets 62a and 64a to respectively receive the shanks 10 and 12.

When the fish strikes the bait, the shanks 10 and 12 are moved to their extended or open position, as shown in Figure 2, by a linkage 66 connected to the forward ends of the shanks 10 and 12. It will be noted that the extending or opening of the shanks causes them to become disengaged from the spring clamp 60 which normally maintains them in the closed or trolling position. As shown in Figures 1 and 2, the linkage 66 includes a pair of links 68 and 70 which are pivotally interconnected by a forward pivot means 72 which, in turn, is connected to a fish line 74. The outer ends of the links 68 and 70 are provided with eyelets 76 and 78, respectively, which are pivotally engaged with the eyelets 16 and 18 on the forward ends of the shanks 10 and 12.

As shown in Figures 5 and 6, the forward pivot means 72 includes a headed shaft 80 extending through and connected to an eyelet 82 on the inner end of one link 68. The shaft 80 is journaled in an eyelet or bearing 84 attached to the inner end of the other link 70. A releasable collar 86 similar to the releasable collar 30 previously described, is fixedly connected to the bearing 84 and, in its closed position, the collar 86 engages a cooperating peripheral groove 88 in the shaft 80.

In the illustrated embodiment, the forward pivot means 72 is connected to the fish line 74 by means of a pull rod 90 which is provided with eyelets 92 anad 94 on its rearward end and its forward end, respectively. The eyelet 92 on the rearward end is rotatably mounted on the shaft 80 between the eyelet 82 and the bearing 84. The eyelet 94 in the forward end of the pull rod 90 is connected to the fish line 74.

While the fish hook assembly may be made of any desired size, it is particularly designed to catch deep sea fish weighing 1,000 pounds or more. In one embodiment of the fish hook assembly which is used to catch large fish the shanks 10 and 12, links 68 and 70, bait rod 50 and pull rod 90 are made of ¼ inch steel rods.

When using the fish hook assembly for large fish, it is preferable to provide means for absorbing the shock of the fish striking the bait. In the illustrated embodiment, the shock absorbing means includes a pair of compression springs 98 and 100 arranged for tension connected between the fishing line 74 and the pull rod 90. The springs 98 and 100 are made of different strengths so that the force of the strike is first taken up in one and then the other.

When the fish strikes the bait, a pull is exerted on the rearward pivot means 14. This pull is transmitted to the fish line 74, where the pull is resisted. Thus the forward ends of the shanks 10 anad 12 are forced inwardly, thereby setting the hooks 20 and 22 in the fish's mouth.

To remove the hooks 20 and 22 from the fish's mouth, the rearward pivot means 14 is disassembled and, if necessary, the forward pivot means 72 is also disassembled. The individual hooks and the bait holding means 48 can then be easily manipulated to remove them from the fish's mouth.

As can be seen from the above, by the present invention a fish hook assembly is provided which assures the setting of the fish hooks in the mouth of the fish. Moreover, the construction of the present fish hook assembly is such that the hooks and bait holding means 48 may be easily and quickly extricated from the fish's mouth, thus saving fishing time and the bait.

Various changes and modifications may be made in the above described fish hook assembly without departing from the spirit or scope of the invention.

Various features of the present invention are set forth in the accompanying claims.

I claim:

1. A fish hook assembly comprising a pair of elongated shanks each having a curved portion at the forward end and a hook at the rear end extending generally to the same side as said curved portion, a releasable first pivot means interconnecting said shanks at a portion intermediate their ends, with the curved forward portion of the interconnected shanks being disposed in laterally diverging relation and with the hooks on the other end of said shanks being directed outwardly, a link turnably connected with the forward end of each of said shanks, an additional releasable pivot means interconnecting the free ends of said links at a position intermediate said forward ends of shanks, means associated with said additional pivot means providing for attachment of a fishing line thereto, and bait means connected to said first pivot means and extending rearwardly therefrom, whereby tension on said bait means is effective to produce outward movement of said hooks and whereby said releasable pivot means provide for separation of said shanks to afford independent manipulation of said hooks in their removal from a fish.

2. A fish hook assembly comprising a pair of elongated shanks each having a curved portion at the forward end and a hook at the rear end extending generally in the same plane and direction as said curved portion, a releasable first pivot means interconnecting said shanks at a portion intermediate their ends, with the curved forward portion of the interconnected shanks being disposed in laterally diverging relation and with the hooks on the other end of said shanks being directed outwardly, a link turnably connected with the forward end of each of said shanks, an additional releasable pivot means interconnecting the free ends of said links at a position intermediate said forward end of said shanks, means associated with said additional pivot means providing for attachment of a fishing line thereto, and bait means connected to said first pivot means and extending rearwardly therefrom, said bait means including a rod rotatably mounted at one end on said first releasable pivot means and having bait supporting means connected to its other end, said bait-supporting means comprising opposing plates fixed to opposite sides of said rod and suitably displaced so that said shanks may occupy a position between said plates and adjacent said rod, whereby tension on said bait means is effective to produce outward movement of said hooks and whereby said releasable pivot means provide for separate detachment of said shanks from the assembly to afford for independent manipulation of said hooks in their removal from a fish.

3. A fish hook assembly comprising a pair of elongated shanks each having a curved portion at the forward end and a hook at the rear end, a releasable first pivot means interconnecting said shanks at a portion intermediate their ends with the curved forward portion of the interconnected shanks being disposed in laterally diverging relation and with the hooks on the other end of said shanks being directed outwardly, a link turnably connected with the forward end of each of said shanks, an additional releasable pivot means interconnecting the free ends of said links at a position intermediate said forward ends of said shanks, means associated with said additional pivot means providing for attachment for a fishing line thereto, and bait means connected to said first pivot means and extending rearwardly therefrom, said bait means including a rod rotatably mounted at one end on said first releasable pivot means and having bait supporting means connected to its other end, said bait-supporting means comprising opposing plates fixed to opposite sides of said rod and suitably displaced so that said shanks may occupy a position between said plates and adjacent said rod, and means connected to said rod for releasably holding said shanks in adjacent relationship to opposite sides of said rod, whereby tension on said bait means is effective to release said shanks from said holding means and produce outward movement of said hooks, and whereby said releasable pivot means affords disengagement of said shanks from the assembly to provide for independent manipulation of said hooks in their removal from a fish.

4. A fish hook assembly comprising a pair of elongated shanks each having a curved portion at the forward end and a hook at the rear end extending generally in the same direction as said curved portion, a releasable first pivot means interconnecting said shanks at a portion intermediate their ends, with the curved forward portion of the interconnected shanks being disposed in laterally diverging relationship and with the hooks on the other end of said shanks being directed outwardly, a link turnably connected with the forward end of each of said shanks, an additional releasable pivot means interconnecting the free ends of said links at a position intermediate said forward ends of said shanks, each of said releasable pivot means including a headed shaft fixedly connected to one shank, a bearing fixedly connected to the other shank and rotatably mounted on said shaft, and a releasable collar fixedly connected to said bearing and engaged with said shaft, means associated with said additional pivot means providing for attachment of a fishing line thereto, and bait means connected to said first pivot means and extending rearwardly therefrom, whereby tension on said bait means is effective to produce outward movement of said hooks and whereby said releasable pivot means provide for independent manipulation of said hooks in their removal from a fish.

References Cited in the file of this patent

UNITED STATES PATENTS

| | | |
|---|---|---|
| 1,237,429 | Westross | Aug. 21, 1917 |
| 2,350,650 | Titus | June 6, 1944 |

FOREIGN PATENTS

| | | |
|---|---|---|
| 488,831 | Italy | Jan. 8, 1954 |